United States Patent
Zimmermann et al.

(10) Patent No.: US 8,571,775 B2
(45) Date of Patent: Oct. 29, 2013

(54) PASSIVE SAFETY SWITCH

(75) Inventors: Martin Zimmermann, Sasbach (DE); Martin Rapp, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/584,301

(22) Filed: Aug. 13, 2012

(65) Prior Publication Data

US 2012/0310500 A1     Dec. 6, 2012

Related U.S. Application Data

(63) Continuation of application No. PCT/DE2011/000115, filed on Feb. 7, 2011.

(30) Foreign Application Priority Data

Feb. 18, 2010  (DE) .......................... 10 2010 008 441

(51) Int. Cl.
*G06F 7/00*      (2006.01)
(52) U.S. Cl.
USPC .................................. 701/67; 701/63; 477/5
(58) Field of Classification Search
USPC ............................. 701/51, 63, 67; 477/4, 5, 8
See application file for complete search history.

(56) References Cited

U.S. PATENT DOCUMENTS

| | | | | |
|---|---|---|---|---|
| 4,747,056 A | * | 5/1988 | Yamamoto et al. | 701/63 |
| 4,790,225 A | * | 12/1988 | Moody et al. | 83/100 |
| 4,922,425 A | * | 5/1990 | Mack et al. | 701/63 |
| 5,908,460 A | * | 6/1999 | Amisano et al. | 701/51 |
| 6,181,066 B1 | * | 1/2001 | Adamson | 315/282 |
| 8,086,381 B2 | * | 12/2011 | Fritzer et al. | 701/63 |
| 2002/0180412 A1 | * | 12/2002 | Yi | 323/283 |
| 2009/0105917 A1 | * | 4/2009 | Schweizer | 701/67 |
| 2010/0042302 A1 | * | 2/2010 | Fritzer et al. | 701/62 |
| 2011/0054754 A1 | * | 3/2011 | Zimmermann et al. | 701/68 |

FOREIGN PATENT DOCUMENTS

| | | |
|---|---|---|
| DE | 102008061564 | 7/2009 |
| EP | 0798497 | 10/1997 |
| EP | 1672777 | 6/2006 |

* cited by examiner

*Primary Examiner* — Helal A Algahaim
(74) *Attorney, Agent, or Firm* — Simpson & Simpson, PLLC

(57) ABSTRACT

The invention relates to a smart actuator for actuating a clutch having a communication interface for connecting to a higher-level control unit, and at least one data line for connecting to the higher-level control unit, where the smart actuator is configured to identify errors in the higher-level control unit and/or an assigned second smart actuator, and where the smart actuator has controlling means that are suitable for converting the controlled system into a safe system state in the case of a recognized error. Furthermore, the invention relates to a corresponding control method and a control system in which the smart actuators and the method are used.

8 Claims, 4 Drawing Sheets

PASSIVE SAFETY SWITCH

CROSS-REFERENCE TO RELATED APPLICATIONS

This application is filed under 35 U.S.C. §120 and §365(c) as a continuation of International Patent Application No. PCT/DE2011/000115, filed Feb. 7, 2011, which application claims priority from German Patent Application No, 10 2010 008 441.7, filed. Feb. 18, 2010, which applications are incorporated herein by reference in their entirety.

FIELD OF THE INVENTION

The invention relates broadly to a passive safety switch.

Safety switches are, for example, located in the area of clutch-operated transmissions, especially double clutch transmissions and preferably parallel shift transmissions (PST).

PST (parallel shift transmissions) are double clutch transmissions. Even and uneven nears are mourned separately on intermounted shafts in a transmission housing. These two shafts are also engaged separately by two clutches nested inside each other. During a gearshift, first the desired gear is engaged on the shaft with an open clutch. Then, this clutch is continuously engaged while the other clutch is continuously disengaged at the same time Actuation is optionally provided by electric motors or electrohydraulic controls.

BACKGROUND OF THE INVENTION

Safety circuits are known from the prior art. Such a system is, for example, disclosed in German Patent Application No. 10 2008 061 564. So-called actuators are monitored by a control unit and, when an error is identified, the relevant actuator is deactivated, for example, by shutting off the output stage. A second actuator is enabled to restore a safe system status, for example, by disengaging its clutch.

A disadvantage of this arrangement is that monitoring cannot be performed when there is an error in the control unit, or during a reset state, or when the connection is faulty between the control unit and actuators. If both actuators were shut off in this case, a safe system state could not be achieved.

Thus, there is a long-felt need for improved safety circuitry that avoids one or more disadvantages of the prior art and contributes to greater system safety.

BRIEF SUMMARY OF THE INVENTION

One object of the invention is to provide smart actuators that possess an actuator-internal control unit with enhanced logic in comparison to conventional actuators.

Such smart actuators for actuating a clutch have an actuator-internal control unit and a communication interface for connecting to a higher-level control unit, and at least one data line for connecting to the higher-level control unit. Furthermore, the smart actuator is set up so that it can identify an error in the higher-level control unit and/or an assigned second smart actuator, and it has controlling means that are suitable for converting, the controlled system into a safe system state in the case of a recognized error.

In case of an error in the higher-level control unit, for example, when it is in reset mode or when communication is no longer possible with the smart actuator due to a broken cable or another influence, the control system can be converted into a safe system state.

In another embodiment, a smart actuator also has means for delayed shutoff when communication with the higher-level control unit is faulty.

This measure causes the smart actuator to independently shut off in the event of a recognized broken cable or other communication problem with the control unit, thus, increasing the security of the control system in case of an error.

In yet another embodiment, the means for delayed shutoff are designed as an RC element.

This embodiment is, on the one hand, more economical and can also be adapted very easily to the given conditions.

In one embodiment, the delayed shutoff time is greater than or equal to the time required to convert the first smart actuator into a safe state between the onset of the error and the shutoff of the monitored second smart actuator.

It is preferable that a controlled system can be converted into a safe system state even when a cable is broken on an assigned smart actuator.

Furthermore, in another embodiment the delayed shutoff time is greater than the shutoff time of an active shutoff triggered by the control unit.

This can ensure that a brief interruption in communication does not immediately cause a shutoff.

In yet another embodiment, the delayed shutoff time is greater by one or more orders of magnitude than the shutoff time of an active shutoff caused by a control unit.

Furthermore, the invention also includes a control method to solve the portrayed disadvantages. In this method for controlling a first smart actuator for actuating a clutch, the smart actuator has a communications interface for connecting, to a higher-level control unit, and at least one data line for connecting to the higher-level control unit. The method includes the step of identifying an error in the higher-level control unit and/or an assigned second smart actuator, and the step of controlling the clutch, in the case of the identified error, in order to convert the controlled system into a safe system state.

In one embodiment, the method includes the step of receiving a message that the assigned second smart actuator is faulty.

Furthermore, the invention includes a control system that has a control unit and a smart actuator. These are connected by at least one data line and a communication interface.

In one embodiment of the control system, the smart actuator includes a method.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary, it is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
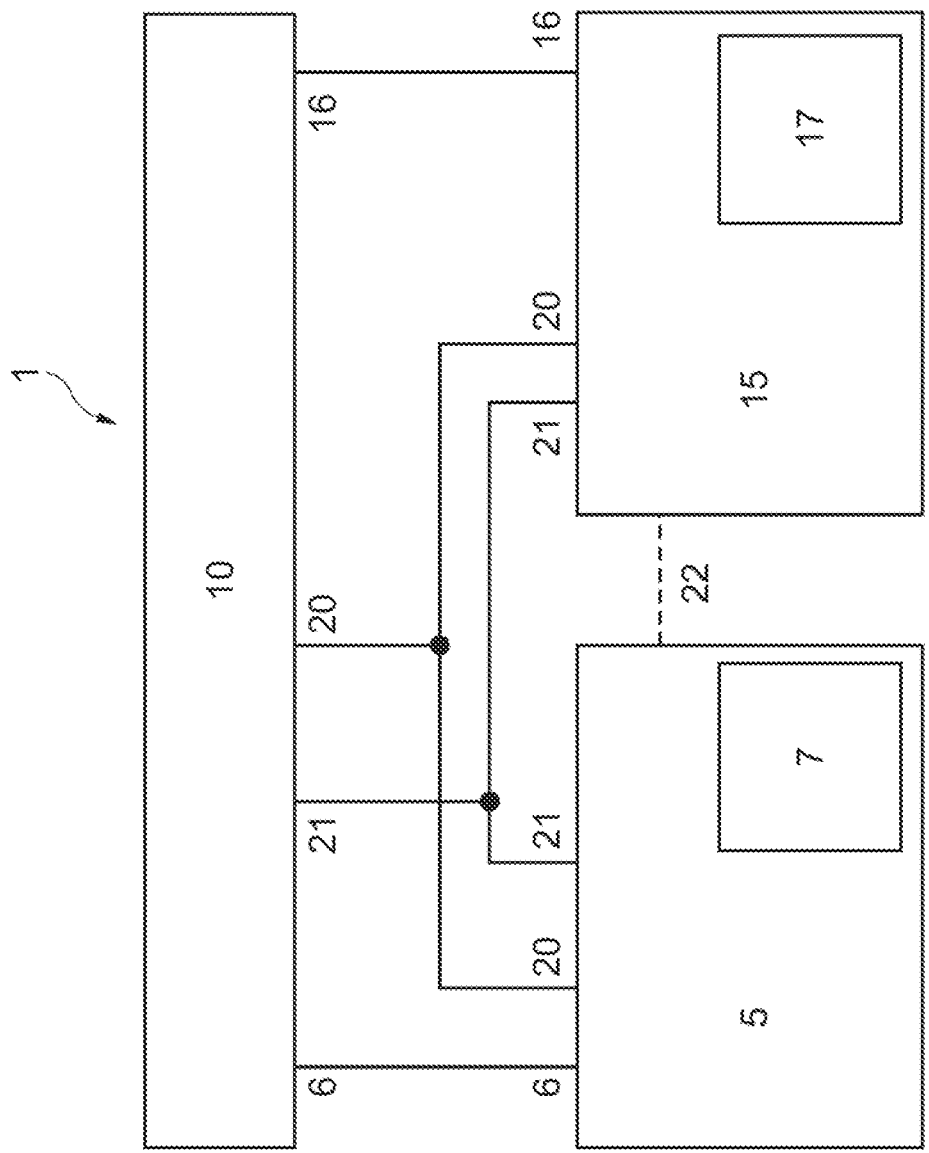
FIG. 1 is a schematic control system.

FIG. 1 schematically portrays control system 1. Control system 1 has smart actuator 5, for example, to actuate a clutch. Furthermore, control system 1 has higher-level control unit 10.

Both higher-level control unit 10 and smart actuator 5 have communication interface 20 for connecting with each other.

Communication interface 20 can have a vehicle bus system that is used to exchange control and/or status information, such as a CAN bus.

Furthermore, both higher-level control unit 10 and smart actuator 5 have data line 6, 21 for connecting with each other.

Data line 6 can, for example, transmit an emergency stop signal. This emergency stop signal can, for example, be configured so that the interruption of data line 6 is equivalent to the active signaling of an emergency stop. This can, for example, be achieved in that the emergency stop signal is signaled by signaling a low voltage level, whereas operation is signaled by a high voltage level.

Alternately or in addition, an enablement/disablement signal could be transmitted via data line 21. Such an enablement/disablement signal can, for example, be derived, from starting an engine that is connected to the controlled transmission.

This signal can also be configured as the emergency stop signal. i.e., so that the interruption of data line 6 is equivalent to the active signaling of an emergency stop. This could be achieved in that the disablement signal is signaled by signaling a low voltage level, whereas in operation, the enablement signal, is signaled by a high voltage level.

Furthermore, smart actuator 5 includes means for controlling 7 that are suitable for converting a control system into a safe system state in the event of a recognized error. These means tier controlling 7 can be the same means that are otherwise used for clutch shifting operations.

In addition, smart actuator 5 is set up so that it can recognize errors in higher-level control unit 10.

Such an error is, for example, the loss of communication via communication interface 20. Such a loss of communication can arise when higher-level control unit 10 is in reset mode, or the communication interface of the higher-level control unit is defective, or the physical connection with communication interface 20 is separated because the plug is pulled.

In this case, smart actuator 5 can recognize that communication is interrupted by, for example, a timeout from a corresponding meter. The timeout is oriented around the typically expected time within which communication with the higher-level control unit can be expected.

Depending on the system used tbr communication interface 20, different modes can be provided such as passive monitoring or active monitoring in which heartbeat messages are transmitted. In the case of heartbeat messages, one could provide that, after a certain number of unsuccessful heartbeat requests, it is assumed that communication is interrupted.

Furthermore, in systems in which the first smart actuator is assigned a similar or equivalent actuator 15, first smart actuator 5 can still be configured so that it can recognize an error in assigned second smart actuator 15. Such second smart actuator 15 with corresponding data lines 16 for emergency stop or data line 21 for an enablement/disablement signal as well as communication interface 20 is also portrayed in FIG. 1.

Such an error is, for example, the loss of communication via communication interface 20 from control unit 10 to second assigned smart actuator 15. Such a loss of communication can arise when communication interface 20 between the higher-level control unit and smart actuator 15 is defective, or when pulling the plug disconnects the physical connection with communication interface 20.

In this case, first smart actuator 5 can either be informed by a message via communication interface 20 via higher-level control unit 10 that such a loss of communication has arisen with assigned smart actuator 15, or first smart actuator 5 and assigned smart actuator 15 have additional data line 22 by means of which the loss of communication with higher-level control unit 10 can be signal directly.

In another embodiment, the recognition of both signals via communication interface 20 and data line 22 can be used to provide greater reliability in the recognition of a loss of communication with one of the smart actuators.

In this embodiment, the signals can be linked, for example, by a logical AND function so that the conversion of the controlled system into the safe system state is only triggered when the signals arise simultaneously.

If an error of the above-described type is identified, the means for controlling 7 are controlled so that the transmission is convened into a sale system state, for example, by disengaging a clutch.

In yet another embodiment, a smart actuator also has means for delayed shutoff 107; 117 when communication with higher-level control unit 10 is faulty.

Figure 2A:
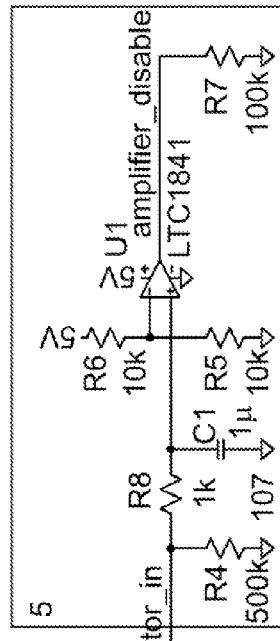
FIG. 2*a* is an embodiment of part of a smart actuator of the present invention.
Figure 2A:
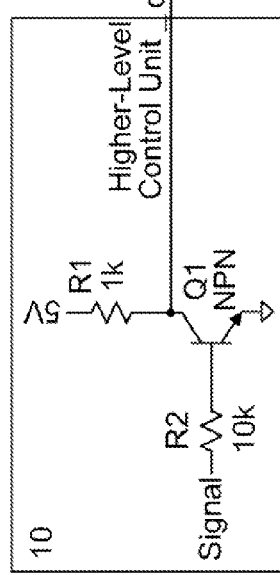
Figure 2B:
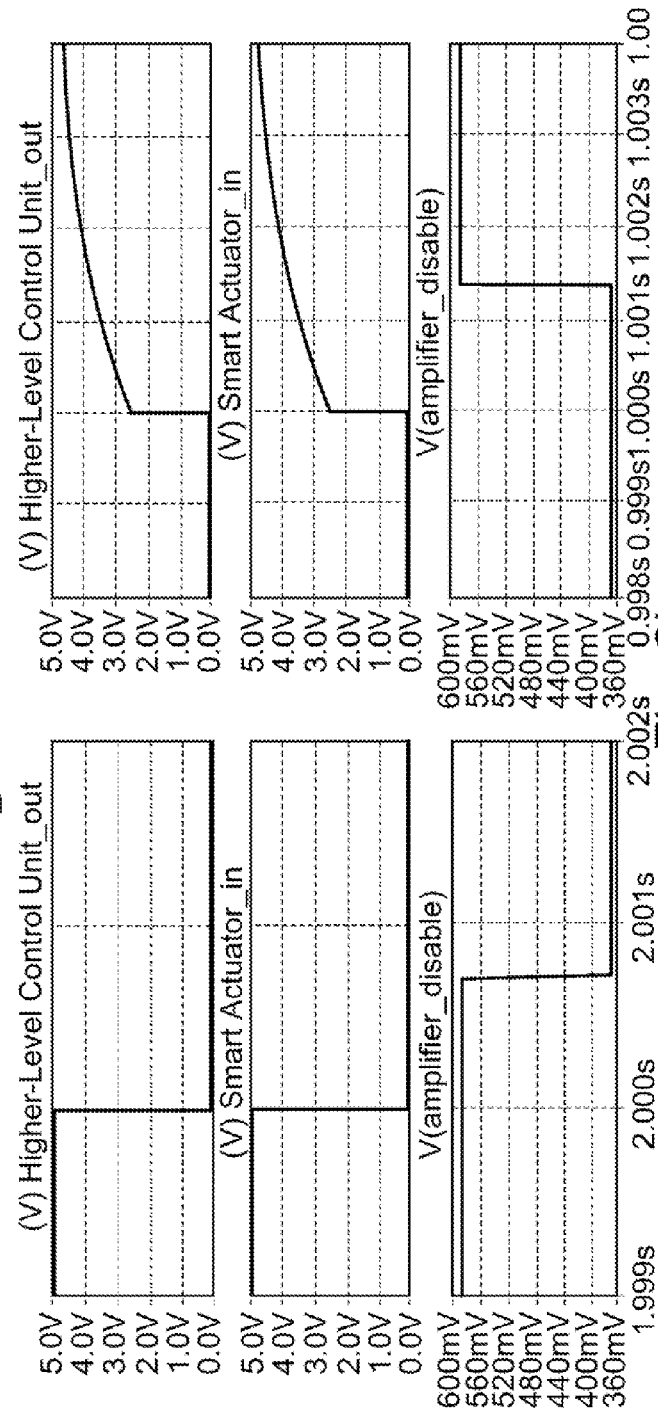
FIG. 2*b* displays associated voltage/timing characteristics.

FIG. 2a shows an embodiment of part of a smart actuator of the present invention, while FIG. 2b displays associated voltage/time characteristics.

In FIG. 2a, higher-level control unit 10 transmits a signal, for example, via data line 6 or 21, to smart actuator 5. This is identified at the output as higher-level control unit_out and is correspondingly shown in FIG. 2b as V(higher-level control unit_out). The corresponding signal received by smart actuator 5 via data line 6 or 21 is identified as smart actuator_in in FIG. 2a and correspondingly as V(smart actuator_in) in FIG. 2b. The signal evaluated by smart actuator 5 is identified as amplifier_disable in FIG. 2a and correspondingly as V(amplifier_disable) in FIG. 2b.

In the portrayed example, an active shutoff is triggered at time 2 seconds, tier example, by transmitting the emergency stop signal. In the portrayed example, the emergency stop signal is shown from actively drawing the voltage V(higher-level control unit_out) to a low potential, in this case, e.g., 0 V, in the left half of FIG. 2b. This exemplary drawing almost immediately causes a change in voltage V(smart actuator_in) which simultaneously drops to a low potential, in this case, e.g., 0 V. After a finite but short time of for example, less than/ms, the output signal V(amplifier_disable) is also drawn from a high voltage to a low voltage, which triggers the shutoff of the smart actuator by means of the output signal V(amplifier_disable).

If switching on is retriggered at a later time, this results in the switching behavior as shown on the right side of FIG. 2b.

In this case, active switching on is triggered at time/s, for example, by withdrawing the emergency stop signal. In the portrayed example, the emergency stop signal is shown from actively drawing the voltage V(higher-level control unit_out) to a high potential, in this case, e.g., 5 V in the right half of FIG. 2b. This drawing almost immediately causes a change in voltage V(smart actuator_in) which is also drawn up. After a finite but short time of less than 2 ins, the output signal V(amplifier_disable) is also drawn from a low voltage to a higher voltage, which triggers the switching on of the smart actuator by means of the output signal V(amplifier_disable)

The timing of the active shutoff is basically determined by resistor R3 and capacitor C1 in this case.

It is obvious to a specialist that the delayed behavior can also be achieved with other signals, such as the enablement/disablement signal, via data line 21.

Figure 3A:
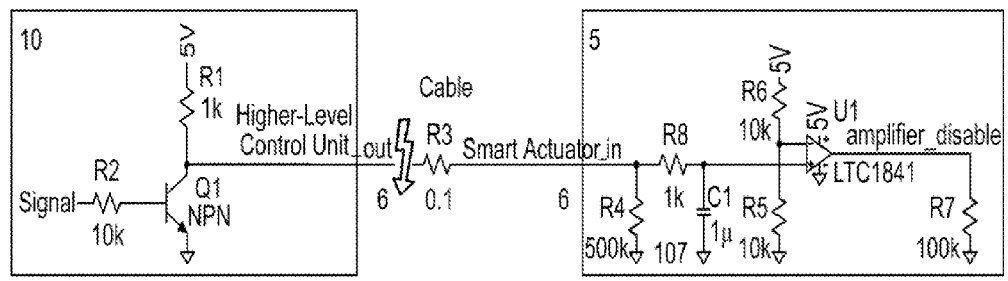
FIG. 3*a* shows an embodiment of part of a smart actuator of the present invention when there is a loss in communication.
Figure 3B:
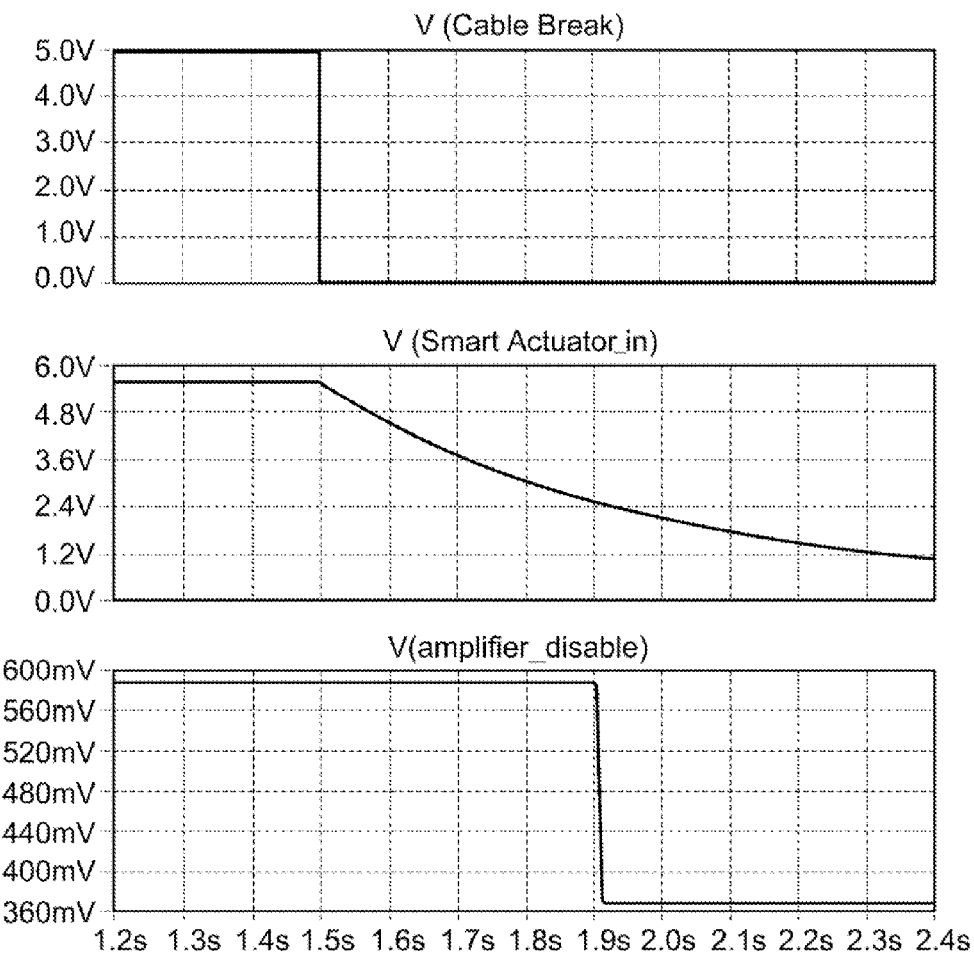
FIG. 3*b* displays associated voltage/time characteristics of the embodiment shown in FIG. 3*a*; and, FIG. 4 is an aspect of an embodiment of a smart actuator of the present invention.

FIG. 3a shows an embodiment of part of a smart actuator with a loss in communication, while FIG. 3b displays associated voltage/time characteristics.

In contrast to the depiction in FIG. 2a, the circuit has an interruption, including an arrow, in data line 6. In FIG. 3a, higher-level control unit 10 transmits a signal, tier example, via data line 6 or 21, to smart actuator 5. Since only the signal after the cable break is of interest, this will be labeled cable break and corresponding identified as V(cable break) [V(cable break)] in FIG. 3b. The corresponding signal received by smart actuator 5 via data line 6 or 21 is identified as smart actuator_in in FIG. 3a and correspondingly as V(smart actuator_in) in FIG. 3b. The signal evaluated by smart actuator 5 is identified as amplifier_disable in FIG. 3a and correspondingly as V(amplifier_disable) in FIG. 3b.

In the portrayed example, an interruption in communication arises at time 1.5 s, for example, by a cable break, pulling the plug, etc. A passive shutoff is then triggered. In the portrayed example, the signal from passively drawing the voltage V(cable break) to a low potential, in this case, for example 0 V is shown in the left half of FIG. 2b. This example of drawing causes a change in voltage V(smart actuator_in) that is also drawn to a lower voltage, but at a delay. After a finite but short time of for example, 400 ms, the output signal V(amplifier_disable) is also drawn from a higher voltage to a low voltage which triggers the shutoff of the smart actuator by means of the output signal V(amplifier_disable).

To achieve this behavior, the smart actuator possesses means for delayed shutoff 107, 117.

Since a delayed shutoff is enabled in this case, smart actuator 5, 15 is given the ability to identify the breakage of its own cable and communicate this as an input signal via other data lines or via a communication interface to other assigned smart actuators 5, 15 and/or the higher-level control unit. These can thereby be given the ability to convert the controlled system into a safe state, for example, by disengaging a clutch.

In one embodiment, means for delayed shutoff 197, 117 are designed as an RC element. The size of resistor R4 and also that of capacitor C1 in FIG. 3a determines the switching behavior. Advantageously, the delayed shutoff time is greater than or equal to the time required to convert smart actuator 5, 15 into a safe state between the onset of the error and the shutoff of monitored smart actuator 5, 15.

Other delay elements can also be used in alternative embodiments. These can also be complex circuits based on special monitoring components, or a shutoff can be delayed by software. Suitable circuits are clearly obvious to a specialist, or are known from the relevant literature, such as Tietze Schenck, Semiconductor Circuitry.

In another embodiment, the time of the delayed shutoff is greater than the switching time of an active shutoff triggered by control unit 10.

This can prevent short-term communication problems from leading to a premature shutoff.

This can be achieved, for example, when the delayed shutoff time is greater by one or more orders of magnitude than the shutoff time of an active shutoff caused by control unit 10.

The shutoff delay is oriented around the time that is required to convert a clutch system into a safe state between the occurrence of the error and the shutoff of the actuator.

Generally, the shutoff delay is greater than the switching times for an active shutoff triggered by a control unit.

In another embodiment, the shutoff delay of the evaluation is greater by one or more orders of magnitude than the switching time of an active shutoff triggered by a control unit.

In yet another embodiment, the shutoff delay of the evaluation is greater by three or more orders of magnitude than the switching time of an active shutoff triggered by a control unit.

Furthermore, the passive safety circuit can have means for signaling that allow the identified error to be evaluated and/or provided to other components as a switching or information signal.

In a general form, switching states can be identified within the control system, for example, according to Table 1 below.

TABLE 1

| | Exchange of data Communication interface 20 | Smart actuator 1 Data line 6 | Smart actuator 2 Data line 16 | Smart actuator 1 Error Reaction | Smart actuator 2 Error Reaction |
|---|---|---|---|---|---|
| Smart initialization | Initialization | ON | ON | Clutch disengaged | Clutch disengaged |
| Drive mode Smart | Defined data exchange | ON | ON | Normal mode | Normal mode |
| Running down Smart | Preparation to shut off | ON | ON | Clutch in end position | Clutch in end position |
| Smart | After acknowledgment | OFF | OFF | Output stage OFF | Output stage OFF |
| Error Smart actuator 1 | Info: Error actuator 1 | OFF | ON | Output stage OFF | Clutch disengaged |
| Error Smart actuator 2 | Info: Error actuator 2 | ON | OFF | Clutch disengaged | Output stage OFF |

TABLE 1-continued

| | Exchange of data Communication interface 20 | Smart actuator 1 Data line 6 | Smart actuator 2 Data line 16 | Smart actuator 1 Error Reaction | Smart actuator 2 Error Reaction |
|---|---|---|---|---|---|
| Error or reset HLCU | No data exchange | ON | ON | Clutch disengaged | Clutch disengaged |
| HLCU plug pulled | No data exchange | OFF (delayed) | OFF (delayed) | Disengage clutch before output stage OFF | Disengage clutch before output stage OFF |
| Cable break Smart 1 Data line 6 | Info: Actuator 1 cable break | OFF (delayed) | ON | Output stage OFF | Clutch disengaged |
| Cable break Smart 2 Data line 16 | Info: Actuator 2 cable break | ON | OFF (delayed) | Clutch disengaged | Output stage OFF |

In Table 1, the first column identifies potential situations and the other columns identify whether a data exchange occurs and the contents of this data exchange as well as the states of data line 6 alternatively or in addition to data line 21 with reference to first smart actuator 5, as well as the states of data line 16 alternatively or in addition to data line 21 with reference to second smart actuator 15. The last two columns show the reaction of the respective smart actuators to the error event. Higher-level control unit 10 is identified as FILEU in the table.

The last six lines of this table are of particular interest in regard to the invention. If an error occurs in first smart actuator 5, this can be signaled by smart actuator 5 via communication interface 20 to higher-level control unit 10, as well as to other smart actuators such as assigned second smart actuator 15 as "Info: Actuator 1 error".

Alternatively, this message can also be exchanged via separate data line 22 alternatively or additionally between the assigned smart actuators.

If an error occurs in second smart actuator 15, this can be signaled by smart actuator 15 via communication interface 20 to higher-level control unit 10, as well as to other smart actuators such as assigned first smart actuator 5 as "Info: Actuator 2 error".

Alternatively, this message can also be exchanged via separate data line 22 alternatively or additionally between the assigned smart actuators.

The respective other smart actuator is enabled to disengage the clutch, whereas the respective faulty smart actuator is actively shut off.

If there is an error or higher-level control unit 10 (HLCU) is reset, there is no exchange of data via the communication interface. In this case, the assigned smart actuators independently determine from the lack of communication that monitoring by higher-level control 10 is impossible, and convert the control system into a safe state, for example, by disengaging the respective clutch.

If a data line is affected by the failure of communication, this is interpreted by the affected smart actuator as a cable break.

If an error occurs in a data line to first smart actuator 5, for example, data line 6 or 21, this can be signaled by smart actuator 5 via communication interface 20 to higher-level control unit 10, as well as to other smart actuators such as assigned second smart actuator 15 as "Info: Actuator 1 cable break".

Alternatively, this message can also be exchanged via separate data line 22 alternatively or additionally between the assigned smart actuators.

If an error occurs in a data line to second smart actuator 15, for example, data line 16 or 21, this can be signaled by smart actuator 15 via communication interface 20 to higher-level control unit 10, as well as to other smart actuators such as assigned second smart actuator 5 as "Info: Actuator 2 cable break".

Alternatively, this message can also be exchanged via separate data line 22 alternatively or additionally between the assigned smart actuators.

The respective other smart actuator is enabled to disengage the clutch, whereas the respective faulty smart actuator is actively shut off.

If an error arises in communication interface 20 and in data lines 6, 16 or 21, this is interpreted as pulling the plug or a failure of the higher-level control unit.

In this case, both mechanisms act on each other, that is, the system is converted into a safe state, for example, by opening and assigned clutch, and then the shutoff of smart actuators 5, 15 is triggered by the delayed shutoff.

When it states in Table 1 that an output stage is switched OFF, this means that the assigned clutch can no longer be controlled. Depending on the configuration, the output stage is then in a tri-state or braking mode.

Figure 4:
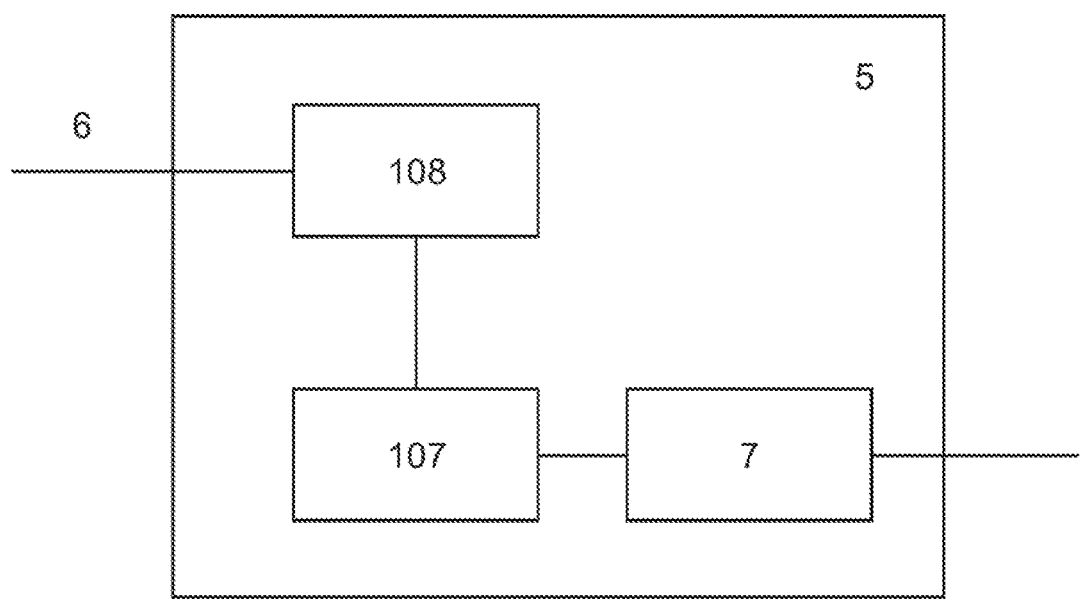

FIG. 4 shows an element of an embodiment of smart actuator 5, 15. In another embodiment, smart actuator 5, 15 can also have means for monitoring data line 108, 118. For example, these means for monitoring data line 108, 118 can monitor the voltage on data line 6, 16, 21, thus, enabling smart actuator 5, 15 to identify the break of monitored data line 6, 16, 21 without additional communication.

Correspondingly, smart actuator 5, 15 can then report this identified error to higher-level control unit 10, for example, via communication interface 20. Furthermore, the identified error can also be reported to assigned second smart actuator 5, 15, for example, directly via data line 22 or indirectly via higher-level control unit 10. Now the first actuator can be shut off at a delay as described above, while the assigned second smart actuator can convert the system into the safe state on the basis of the information.

Thus, it is seen that the objects of the present invention are efficiently obtained, although modifications and changes to the invention should be readily apparent to those having ordinary skill in the art, which modifications are intended to be within the spirit and scope of the invention as claimed it also is understood that the foregoing description is illustrative of the present invention and should not be considered as limiting. Therefore, other embodiments of the present invention are possible without departing from the spirit and scope of the present invention.

| List of reference numbers | |
|---|---|
| 1 | Control system |
| 5 | Smart actuator |
| 6 | Data line |
| 7 | Means for controlling |
| 10 | Control device |
| 15 | Smart actuator |
| 16 | Data line |
| 17 | Means for controlling |
| 20 | Communication interface |
| 21 | Data line |
| 22 | Data line |
| 107 | Means for delayed shutoff |
| 108 | Means for monitoring a data line |
| 117 | Means for delayed shutoff |
| 118 | Means for monitoring a data line |

What is claimed is:

1. A control system, comprising:
a higher-level control unit;
a first smart actuator for actuating a clutch, including:
an actuator-internal control unit;
a first communication interface for connecting to the higher-level control unit; and,
means for controlling;
at least one data line for connecting the first smart actuator to the higher-level control unit; and,
a second smart actuator including a second communication interface for connecting to the higher-level control unit, wherein:
the first smart actuator is configured to identify errors in the higher-level control unit or in the second smart actuator;
the means for controlling are suitable for converting the system into a safe system state in case of an identified error;
the smart actuator also has means for delayed shutoff when communication with the higher-level control unit is faulty; and,
the delayed shutoff time is greater than or equal to the time required to convert the control system into a safe state between the onset of the error and the shutoff of the monitored smart actuator.

2. A smart actuator for actuating a clutch, comprising:
an actuator-internal control unit;
a communication interface for connecting to a higher-level control unit; and
at least one data line for connecting to the higher-level control unit, and means for controlling that are suitable for converting the controlled system into a safe system state in the case of the recognized error, wherein the smart actuator is configured to identify errors in the higher-level control unit and an assigned second smart actuator, wherein:
the smart actuator also has means for delayed shutoff when communication with the higher-level control unit is faulty; and,
the time of the delayed shutoff is greater than the switching time of an active shutoff triggered by the control unit.

3. The smart actuator as recited in claim 1, wherein the means for the delayed shutoff are designed as an RC element.

4. The smart actuator as recited in claim 1, wherein the time of the delayed shutoff is greater than the switching time of an active shutoff triggered by the control unit.

5. The smart actuator as recited in claim 1, wherein the time of the delayed shutoff is greater by one or more orders of magnitude than the switching time of an active shutoff triggered by the control unit.

6. A method for controlling a first smart actuator for actuating a clutch, including a higher-level control unit; the first smart actuator including an actuator-internal control unit, a first communication interface for connecting to the higher-level control unit, and means for controlling; at least one data line for connecting the first smart actuator to the higher-level control unit; and a second smart actuator including a second communication interface for connecting to the higher-level control unit, the method comprising the following steps:
recognizing, using the first smart actuator, an error in the higher-level control unit or in the second smart actuator;
when the error is identified, converting, using the means for controlling, the clutch to convert the controlled system into a safe system state; and,
delaying shutoff of the smart actuator when communication with the higher-level control unit is faulty, wherein the time of the delayed shutoff is greater by one or more orders of magnitude than the switching time of an active shutoff triggered by the control unit.

7. A method for controlling a smart actuator for actuating a clutch, including an actuator-internal control unit and a communication interface for connecting to a higher-level control unit, and at least one data line for connecting to the higher-level control unit, the method comprising the following steps:
identifying an error in the higher-level control unit and in an assigned second smart actuator;
when the error is identified, controlling the clutch to convert the controlled system into a safe system state; and,
delaying shutoff of the smart actuator when communication with the higher-level control unit is faulty, wherein the delayed shutoff time is greater than or equal to the time required to convert the control system into a safe state between the onset of the error and the shutoff of the monitored smart actuator.

8. The method as recited in claim 6, further comprising the following step, reception of a message that the assigned second smart actuator is faulty.

* * * * *